A. J. McCAULEY.
CAR TRUCK.
APPLICATION FILED FEB. 1, 1909.
930,215.
Patented Aug. 3, 1909.
2 SHEETS—SHEET 1.
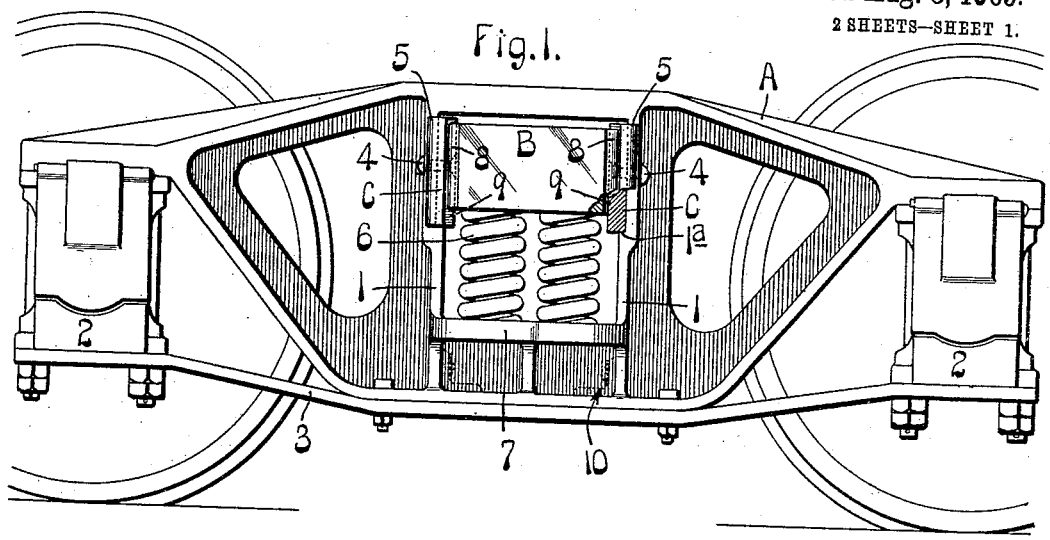
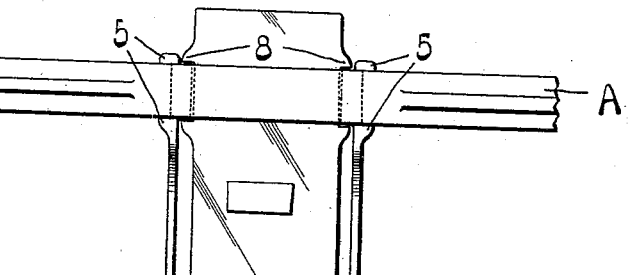
Witnesses
Inventor:
Albert J. McCauley

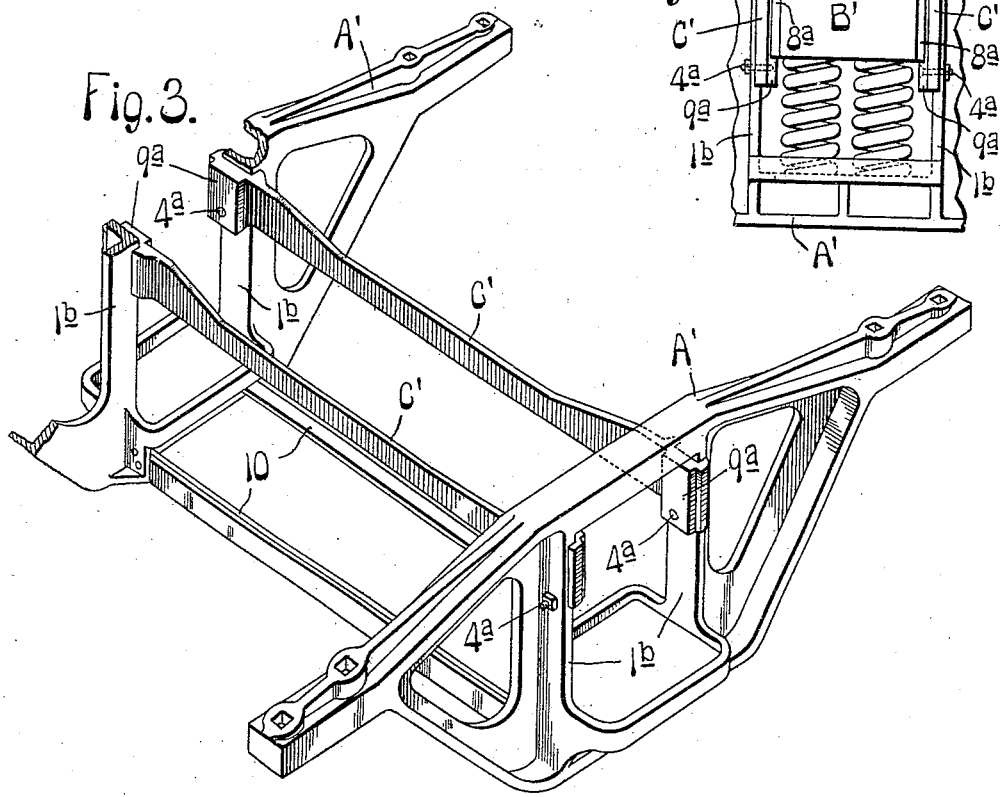
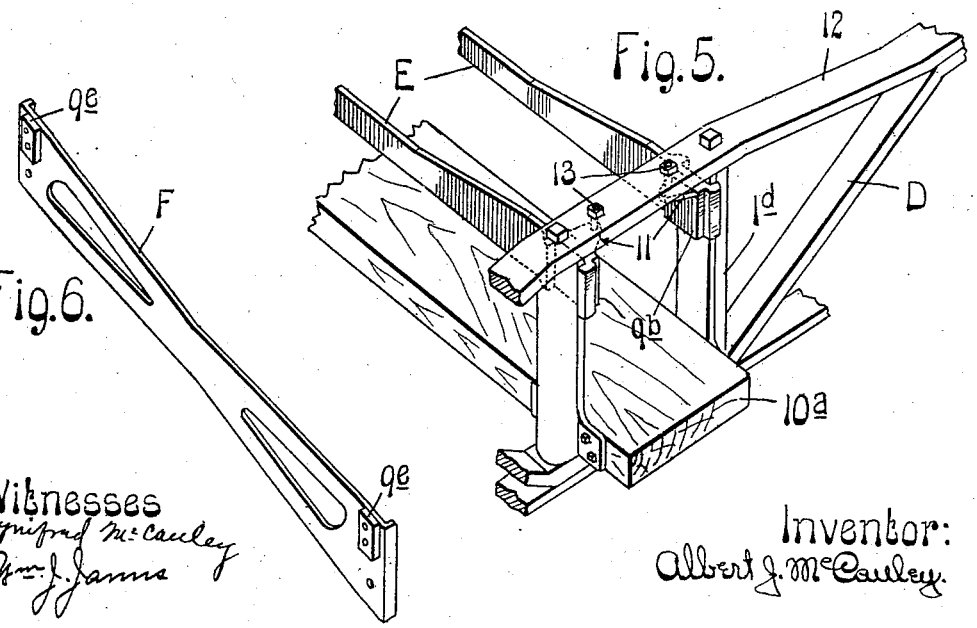

UNITED STATES PATENT OFFICE.

ALBERT J. McCAULEY, OF ST. LOUIS, MISSOURI, ASSIGNOR TO CHARLES McLURE CLARK, OF ST. LOUIS, MISSOURI.

CAR-TRUCK.

No. 930,215.  Specification of Letters Patent.  Patented Aug. 3, 1909.

Application filed February 1, 1909. Serial No. 475,460.

*To all whom it may concern:*

Be it known that I, ALBERT J. MCCAULEY, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a side elevational view of a car truck constructed in accordance with my invention; Fig. 2 is a plan view, partly in section, of a portion of the truck shown in Fig. 1; Fig. 3 is a perspective view of a portion of a slightly modified form of truck, one of the side frames being broken away to more clearly illustrate the connecting members;
Fig. 4 is a side elevational view of a portion of the truck shown in Fig. 3; Fig. 5 is a perspective view showing an arch bar truck having connecting members constructed in accordance with this invention; and Fig. 6 illustrates a modified form of connecting member.

This invention relates to improvements in car trucks, the main object being to provide a strong car truck in which the bolster can be very easily removed.

Other objects and advantages as well as the novel details of construction will be hereinafter described.

In the drawings, A indicates side frames, each of which is in the form of a single casting provided with columns 1 constituting the side walls of a bolster-receiving opening, the ends of said frame being mounted on journal boxes 2.
3 indicates a tie bar secured to the underside of the side frame and connected to the journal boxes.

The side frames A are connected to each other by bars C which extend through the upper portion of the bolster-receiving openings. Bars C are preferably secured to the side frames by means of bolts or rivets 4 and provided with lugs 5 which interlock with the columns 1. If desired, the columns 1 can be provided with shoulders 1ª forming seats for the lower edge of bars C.

A bolster B, interposed between the bars C, extends through the openings in the side frames and rests on springs 6, the latter being supported by a spring seat 7. The bolster is prevented from shifting longitudinally by its guide lugs 8 which coöperate with projections 9 on the bars C (see Fig. 2). By referring to Fig. 1 it will be seen that the projections 9 on bars C are arranged only in the upper portion of the bolster-receiving opening.

To remove the bolster from the truck it is only necessary to remove springs 6, allow the bolster to fall on the spring seats, so as to locate its guide lugs out of alinement with projections 9, and then move it longitudinally through the openings in the side frames.

Figs. 3 and 4 illustrate a portion of a slightly modified form of truck, wherein the connecting bars C', in addition to being interlocked with the side frames A', are secured to the columns 1ᵇ by means of bolts 4ª. The only substantial difference between this form of my invention and the form shown in Fig. 1 is that the shoulders 1ª on the columns have been eliminated and the countersunk head bolts 4ª are located adjacent the lower edge of the connecting members C'. One advantage gained thereby is that the bolster can be removed without removing its supporting springs.

When the bolster B' is mounted in the truck shown in Fig. 3 and Fig. 4, its bottom face is located above the bolts 4ª and its guide lugs 8ª coöperate with the projections 9ª. By removing bolts 4ª and allowing the bars C' to move downwardly until their projections 9ª are out of alinement with the bolster lugs, the bolster can be moved longitudinally through the openings in the side frames.

I have herein shown angle bars 10 extending across the truck and having their ends secured to the lower portions of the side frames, but wish it to be understood that any other suitable means may be employed for connecting the lower portions of the side frames, or, if desired, connecting members at this point may be dispensed with.

Referring now to Fig. 5, which illustrates a portion of a well-known type of arch bar truck, D indicates a side frame provided with columns 1$^d$, a spring plank 10$^a$ being arranged between the lower ends of said columns. Connecting members E are provided with lugs which interlock with the columns and have projecting faces 9$^b$ which coöperate with the guide lugs of a bolster (not shown). The connecting members E are preferably provided with wings 11, secured to the top arch bar 12 by means of rivets or bolts 13.

Fig. 6 illustrates a modified form wherein projections 9$^e$, adapted to coöperate with a bolster, are riveted to the connecting member F.

Various other modified forms of the connecting members will suggest themselves to those skilled in the art; therefore, this invention is not limited to the shapes herein shown, or to connecting members composed of any particular material. The projections forming shoulders which coöperate with the bolster may be secured to the connecting members in any suitable manner. However, where commercially rolled members are employed to connect the side frames, these projections are preferably riveted or bolted in position.

My improved car truck possesses maximum strength because the side frames are connected to each other by reinforcing bars which guide the bolster, these reinforcing bars being located at a point where the bolster transmits very severe shocks to the side frames.

In a car truck constructed in accordance with this invention the usual type of bolster may be used in connection with a side frame composed of a single casting, and the bolster can be removed without removing its supporting springs. Another important advantage of this invention is that the connecting members, which serve as filler blocks between the bolster and columns, will allow old trucks, having wooden bolsters, to be equipped with comparatively narrow metal bolsters, and at the same time they will add a very strong reinforcing element to the old truck structure.

Having thus described the invention, what is claimed as new and desired to be secured by Letters Patent is:

1. A car truck having side frames each composed of a casting provided with a bolster-receiving opening, a member secured to said side frames and connecting them to each other, the ends of said connecting member being arranged in the upper portion of said openings, and a bolster which extends through said openings having guide lugs which coöperate with said connecting member.

2. A car truck having side frames each provided with a bolster-receiving opening, members which extend into the bolster-receiving openings connecting said side frames to each other, and a bolster extending through said openings, said bolster being provided with guide lugs which coöperate with said connecting members.

3. A car truck having side frames each provided with a bolster-receiving opening, members which extend into said openings connecting the upper portions of the side frames to each other, and a bolster extending through said openings and spaced away from the side frames, said bolster being provided with guide lugs which coöperate with said connecting members.

4. A car truck in which removable connecting members extending across the upper portion of the truck are interlocked with the upper portions of the side frames and provided with projecting faces which constitute bolster guides.

5. A car truck in which connecting members extending across the upper portion of the truck are connected to the upper portions of the side frames and provided with projecting faces which constitute bolster guides.

6. A car truck having side frames, each of said side frames being provided with a bolster-receiving opening, members extending across the truck and connecting the side frames, said members being provided with projections, a bolster guided by said projections, said projections being located in the upper portion of the bolster-receiving opening, and springs arranged under the bolster.

7. In a car truck, side frames, each having a bolster-receiving opening, members connecting said side frames, each of said connecting members being provided with bolster guides, a bolster mounted in said openings and coöperating with said bolster guides, and springs arranged under the bolster.

8. In a car truck, side frames, each having a bolster-receiving opening, members connecting the side frames, each of said connecting members being provided with projections which are located in the upper portion of the bolster-receiving openings, a bolster having pairs of guide lugs which coöperate with said projections, and springs arranged under the bolster.

9. In a car truck, side frames, each having a bolster-receiving opening, members connecting the side frames, each of said connecting members being interlocked with the side frames and provided with projections which are located in the upper portion of the bolster-receiving openings, a bolster having pairs of guide lugs which coöperate with said projections, and springs arranged under the bolster.

10. In a car truck, side frames, members which extend across the truck and connect the upper portions of the side frames only, each of said connecting members being provided with bolster guides, a bolster coöperating with said bolster guides, and springs arranged under the bolster.

11. A connecting member for car trucks having a bolster guide adjacent each of its ends and provided with lugs which are adapted to interlock with the side frames of a car truck.

In testimony whereof I hereunto affix my signature in the presence of two witnesses, this 31st day of December, 1908.

ALBERT J. McCAULEY.

Witnesses:
GEORGE BAKEWELL,
GEORGE KUBLIN.